United States Patent
Watanabe

(10) Patent No.: US 7,757,114 B2
(45) Date of Patent: Jul. 13, 2010

(54) DATA SYNCHRONIZATION OF MULTIPLE REMOTE STORAGE AFTER REMOTE COPY SUSPENSION

(75) Inventor: Naoki Watanabe, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 12/199,519

(22) Filed: Aug. 27, 2008

(65) Prior Publication Data

US 2008/0320260 A1 Dec. 25, 2008

Related U.S. Application Data

(63) Continuation of application No. 11/599,493, filed on Nov. 13, 2006, now Pat. No. 7,421,614, which is a continuation of application No. 10/386,277, filed on Mar. 11, 2003, now Pat. No. 7,139,932, which is a continuation-in-part of application No. 10/042,376, filed on Jan. 3, 2002, now Pat. No. 6,745,303.

(51) Int. Cl.
G06F 11/00 (2006.01)

(52) U.S. Cl. .................. 714/6; 714/7; 714/15; 714/42; 711/162

(58) Field of Classification Search ................ 714/5–7, 714/15, 42; 711/161, 162; 707/200–204
See application file for complete search history.

(56) References Cited

U.S. PATENT DOCUMENTS

| | | | |
|---|---|---|---|
| 5,432,922 A | 7/1995 | Polyzois et al. |
| 5,673,382 A | 9/1997 | Cannon et al. |
| 5,742,792 A | 4/1998 | Yanai et al. |
| 5,870,537 A | 2/1999 | Kern et al. |
| 5,901,327 A | 5/1999 | Ofek |
| 6,035,412 A | 3/2000 | Tamer et al. |
| 6,044,444 A | 3/2000 | Ofek |
| 6,052,797 A | 4/2000 | Ofek et al. |
| 6,073,209 A | 6/2000 | Bergsten |
| 6,088,740 A | 7/2000 | Ghaffari et al. |
| 6,092,066 A | 7/2000 | Ofek |
| 6,141,701 A | 10/2000 | Whitney |

(Continued)

FOREIGN PATENT DOCUMENTS

JP 10-133926 A 5/1998

(Continued)

*Primary Examiner*—Philip Guyton
(74) *Attorney, Agent, or Firm*—Mattingly & Malur, P.C.

(57) ABSTRACT

A method and apparatus are provided for enhancing the performance of storage systems to allow recovery after all types of suspensions in remote copy operations. Data is synchronized after an interruption in transfer between a first storage volume of a primary storage system and a first storage volume of a secondary storage system which also includes a second storage volume. After the interruption is detected, at the primary storage system, a record is provided of the data written onto the first storage volume of the primary storage system, and at the secondary storage volume a record is provided of the data written onto the first storage volume of the secondary storage system. Then, at least a partial copy of the record of the data written onto the first storage volume of the primary storage system is written onto the second storage volume. Using the copy, the first storage volume of the secondary storage system is synchronized with the second storage volume of the secondary storage system.

8 Claims, 14 Drawing Sheets

U.S. PATENT DOCUMENTS

| | | |
|---|---|---|
| 6,157,991 A | 12/2000 | Aron |
| 6,173,377 B1 | 1/2001 | Yanai et al. |
| 6,189,079 B1 | 2/2001 | Micka et al. |
| 6,199,074 B1 | 3/2001 | Kern et al. |
| 6,209,002 B1 | 3/2001 | Gagne et al. |
| 6,247,099 B1 | 6/2001 | Skazinski et al. |
| 6,260,124 B1 | 7/2001 | Crocket et al. |
| 6,304,881 B1 | 10/2001 | Halim et al. |
| 6,304,980 B1 | 10/2001 | Beardsley et al. |
| 6,308,284 B1 | 10/2001 | LeCrone et al. |
| 6,480,970 B1 | 11/2002 | DeKoning et al. |
| 6,529,944 B1 | 3/2003 | LeCrone |
| 6,571,278 B1 | 5/2003 | Negishi et al. |
| 6,643,671 B2 | 11/2003 | Milillo et al. |
| 6,643,795 B1 | 11/2003 | Sicola et al. |
| 6,665,780 B1 | 12/2003 | Bradley |
| 6,671,705 B1 | 12/2003 | Duprey et al. |
| 6,691,245 B1 | 2/2004 | DeKoning |
| 7,421,614 B2 * | 9/2008 | Watanabe ............ 714/6 |
| 7,430,646 B2 * | 9/2008 | Cox et al. ............ 711/162 |
| 7,603,581 B2 * | 10/2009 | Boyd et al. ............ 714/6 |
| 2002/0049776 A1 | 4/2002 | Aronoff et al. |
| 2002/0103943 A1 | 8/2002 | Lo et al. |
| 2003/0126388 A1 | 7/2003 | Yamagami |

FOREIGN PATENT DOCUMENTS

| | | |
|---|---|---|
| JP | 2000-020366 A | 1/2000 |
| JP | 2001-290687 A | 10/2001 |

* cited by examiner

DATA SYNCHRONIZATION OF MULTIPLE REMOTE STORAGE AFTER REMOTE COPY SUSPENSION

CROSS-REFERENCE TO RELATED APPLICATIONS

This patent application is a continuation of U.S. application Ser. No. 11/599,493, filed Nov. 13, 2006, which is a continuation of U.S. application Ser. No. 10/386,277, filed Mar. 10, 2003, which is a continuation-in-part of U.S. application Ser. No. 10/042,376 filed Jan. 3, 2002, all of which are incorporated by reference herein in their entirety for all purposes.

BACKGROUND OF THE INVENTION

The present invention relates generally to data processing storage systems which include a primary (or local) storage facility and two or more secondary (or remote) storage facilities that mirror at least certain of the data retained by the primary storage facility. More particularly, the invention relates to a method, and apparatus implementing that method, to synchronize the data at surviving storage facilities in the event of an interruption in copying data from one storage location to another storage location.

Extensive use of data processing by commercial, governmental and other entities has resulted in tremendous amounts of data being stored—much of it of extreme importance to the day-to-day operation of such entities. For example, enormous numbers of financial transactions are now performed entirely electronically. Businesses, for example, airline companies risk chaos should data regarding future ticketed reservations be lost. As a result of the need for reliable data, local data is usually backed up, often to a remote location, with one or more copies of the data retained for use should the original data be corrupted or lost. The more important the data, the more elaborate the methods of backup. For example, one approach to protecting sensitive or valuable data is to store backup copies of that data at sites that are geographically remote from the local storage facility. Each remote storage facility maintains a mirror image of the data held by the local storage facility, and revises that stored data to "mirror" changes to the local data image of the local storage facility as it is changed. One example of a remote storage system for mirroring data at a local storage system is described in U.S. Pat. No. 5,933,653, entitled "Method and Apparatus for Mirroring Data in a Remote Data Storage System."

Updated data sent to the remote storage facilities are often queued and sent as a group over a network transmission medium such as the Internet, to reduce the overhead of remote copying operations. Thus, the data image mirrored at the remote site and that at the local site will not necessarily be the same. If more than one remote storage is used to mirror the local data, there will be situations in which the data images of the remote storages will be different from one another—at least until updated. These interludes of different data images can be a problem if the local facility fails. Failure of the local storage facility can leave some remote storage facilities with data images that more closely, if not exactly, mirror that of the local storage facility before failure, while others have older "stale" data images that were never completely updated by the last update operation. Thus, failure of the local storage facility may require the remote storage facilities to resynchronize the data among them to assure all have the same latest data image before restarting the system.

One problem which also must be addressed is recovery of the system in the circumstance where a "suspension" occurs during a remote copy operation. An interruption by an unexpected incident, for example, a cache overflow, a storage system failure during copying, a network interruption or other intervention in the remote copy operation, requires that a resynchronization be performed. One approach for resynchronizing remote copy operations is described in U.S. Pat. No. 6,092,066 entitled "Method and Apparatus for Independent Operation of a Remote Data Facility." The technique described in this patent, however, only allows resynchronization in limited circumstances. With certain types of more complex system suspensions, such as a combination of two failures, e.g. a link failure, cache overflow, and/or a drive failure, there is no ready solution to re-synchronizing the system which avoids reinitializing the system. In these types of situations, because this technology does not assure that the configuration will have at least two copies available, a full copy of the volume is usually required for resynchronization.

BRIEF SUMMARY OF THE INVENTION

This invention provides an improved data processing storage system in which a primary storage facility and a secondary storage facility mirror data between themselves. Typically, each of the storage systems includes volumes for storing data, and the volumes are maintained in a mirrored condition. If there is an interruption in the transmission of data between volumes, for example, caused by a failure of one or the other of the storage volumes, or a failure of the interconnecting network, a time stamped bitmap created at the primary storage system is stored in one of the secondary storage subsystems. These records are then used to resynchronize the pair after the connection link is established. In the event that one member or the other of the pair fails, at the time of failure a record is made on a different storage volume of the status of the write operations to the failed storage volume. This record can then be used to resynchronize the storage volumes at a later time.

Preferably, each of the primary and secondary storage systems include extra volumes, and at the time of suspension of operation of the mirrored remote pair, bitmaps will be stored from each member of the pair to one of the additional storage volumes. As mentioned, these bitmaps may then be used to resynchronize a new pair, even if the information contained on one member of the former pair has been lost. The resynchronization is accomplished by exchanging bitmaps between the new pair, and on that basis determining a set6 of write operations necessary to resynchronize the new pair. These write operations are then carried out, resulting in a new synchronized pair.

Preferably, a method of synchronizing data stored in a storage system after an interruption in a transfer of data between a first storage volume of a primary storage system and a first storage volume of a secondary storage system which also includes a second storage volume includes the following steps: first, detecting an interruption in the transfer of data from the primary storage system to the secondary storage system, then at the primary storage system, providing a record of the data written onto the first storage volume of the primary storage system, and at the secondary storage volume providing a record of the data written onto the first storage volume of the secondary storage system. Next, a step is performed of creating on the second storage volume at least a partial copy of the record of the data written onto the first storage volume of the primary storage system. Then using the at least partial copy on the second storage volume and the record of the data written onto the first storage volume of the secondary storage system, the first storage volume of the secondary storage system is synchronized with the second storage volume of the secondary storage system.

In another embodiment, a method of synchronizing data stored in a cascaded storage system is provided the storage system includes first, second, third and fourth storage volumes serially connected. After an interruption in a transfer of data between the second storage volume and the third storage volume, the system is resynchronized by, at the second storage volume, providing a first record of the data written onto the second storage volume, and at the third storage volume providing a second record of the data written onto the third storage volume. Then the system copies at least portions of the first record to the first storage volume; and at least portions of the second record to the fourth storage volumes. After the copying, a step is performed using at least one of the portions copied, of synchronizing at least one of the second and third storage volumes to at least one of the first and fourth storage volumes.

DETAILED DESCRIPTION OF THE INVENTION

Figure 1:
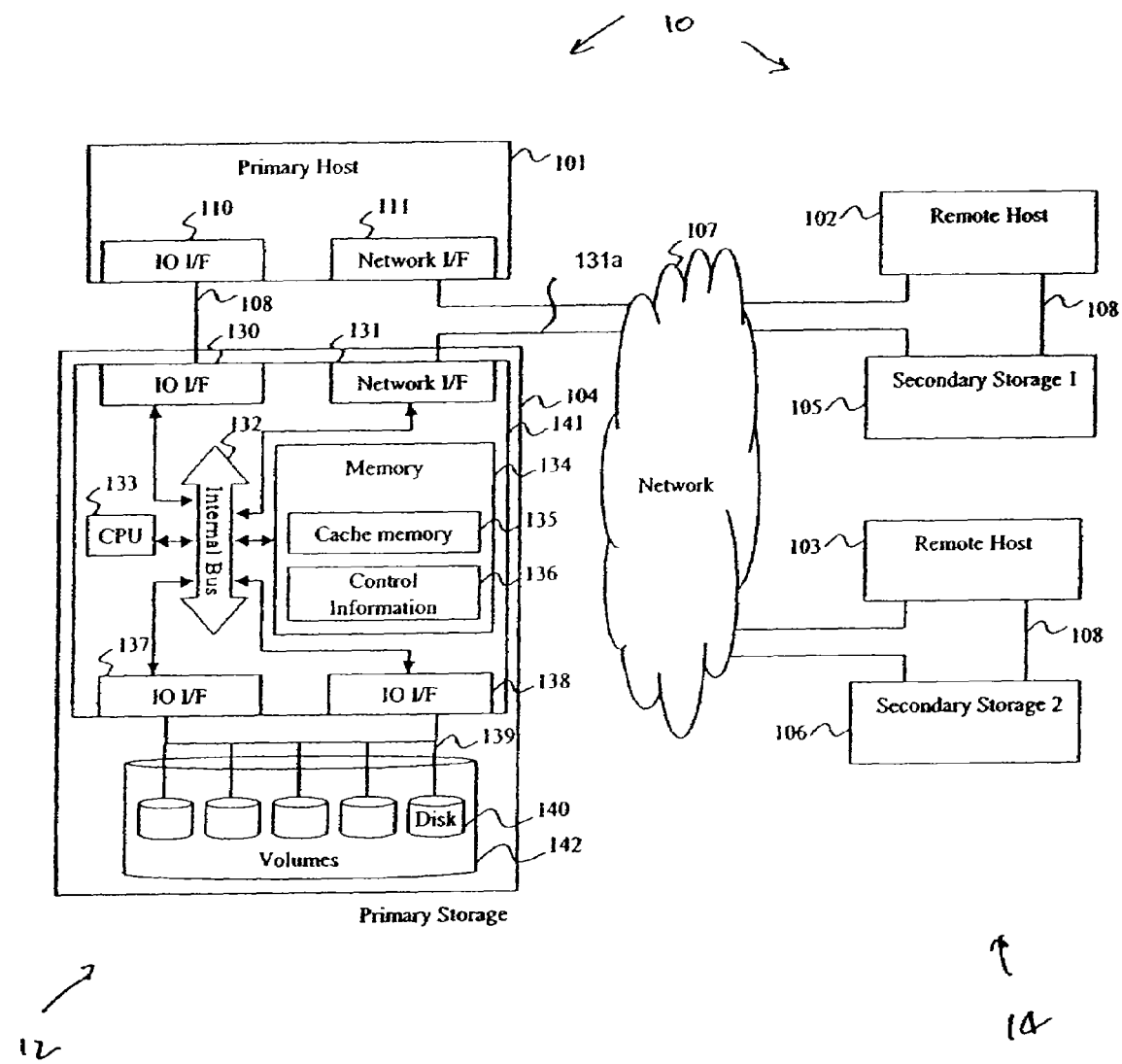
FIG. 1 is a block diagram illustration showing a data processing system, including local and multiple remote storage facilities which implement one embodiment of the present invention.

FIG. 1 illustrates a storage system in the form of a data processing system 10, including a primary or local site 12 and a number of secondary or remote sites 14 communicatively interconnected by a data communicating network 107. The local site 12 is shown as including a host processor 101 and a local storage facility 104. The host 101 and storage facility 104 are coupled to the remote sites 14 by the network 107 for communicating updates made to the data image kept by the local site 12 to the remote sites 14. Thus, the remote sites 14 maintain data images that mirror that of the local site 12.

The remote sites 14 are shown as each including remote storage facilities 105, 106. Each site 14 may or may not have corresponding host processors 102, 103. The remote storage facilities 105, 106 preferably include storage media much like that of the local storage facility to keep the data images that will mirror that of the remote storage facility 104. Although the remote sites provide access to needed data in the event of planned or unplanned outages of the local storage facility 104, it may be more beneficial to locate the remote sites 14 geographically removed from the local storage facility 104 to protect the sites and the data they maintain should the local site 12 encounter a catastrophic or disastrous event that destroys the data. The remote storage facilities 105, 106 are substantially identical to the local storage facility 104 so that a discussion of the local storage facility applies equally to the remote storage facilities 105, 106.

At the local site 12, the host processor 101 connects to the network 16 through a network interface (I/F) 111, and to the local storage facility 104 through an input/output (I/O) bus 108 and I/O interface 110. The local storage facility 104 includes a disk controller 141 having an I/O interface 130 to receive the I/O bus 108, and a network interface 131 and network connection 131 a to connect to the data communicating network 107. The local storage facility 104 also includes storage media 142, here implemented by disk units 140, to which the disk controller 141 connects by a data path 131 through an I/O interface elements 137, 138.

The disk controller 141 itself has a central processing unit (CPU) 133 coupled to a memory 134 via an internal bus 132, which also connects to the various interfaces (e.g., I/O IF 130, 138, network I/F 131, etc.) of the disk controller. The memory 134 will include cache memory 135 to cache reads and writes involving the storage media 142 in response to I/O requests from the host 101. The memory may also be used for maintaining certain data structures and information such as control information 136.

CPU 133 preferably will execute a remote copy process that, in conventional fashion, operates to send any changes to the data image on the storage media 142 (as established, for example, by the host processor 101) to the remote storage facilities 105, 106. Thus, the remote storage facilities 105, 106 will mirror the data maintained by the local storage facility 104.

Briefly, a remote copy process operates as follows: When the disk controller 104 receives an I/O write request which either adds to, changes, deletes, or otherwise modifies the data (data image) kept on the storage media 142, it will write that data to the storage media. Each such write to the storage media, or at least that portion of which the data image is mirrored at the remote sites 14, will cause a data message to be created and placed on a remote copy queue (not shown). The remote copy queue is periodically reviewed by the remote copy process running on the CPU 133. When the queue is found to contain one or more data messages, the messages are retrieved and sent to each of the remote storage facilities 105, 106, which in turn will write the data of the data message, thereby updating their data images to that of the local site 12.

Figure 2:
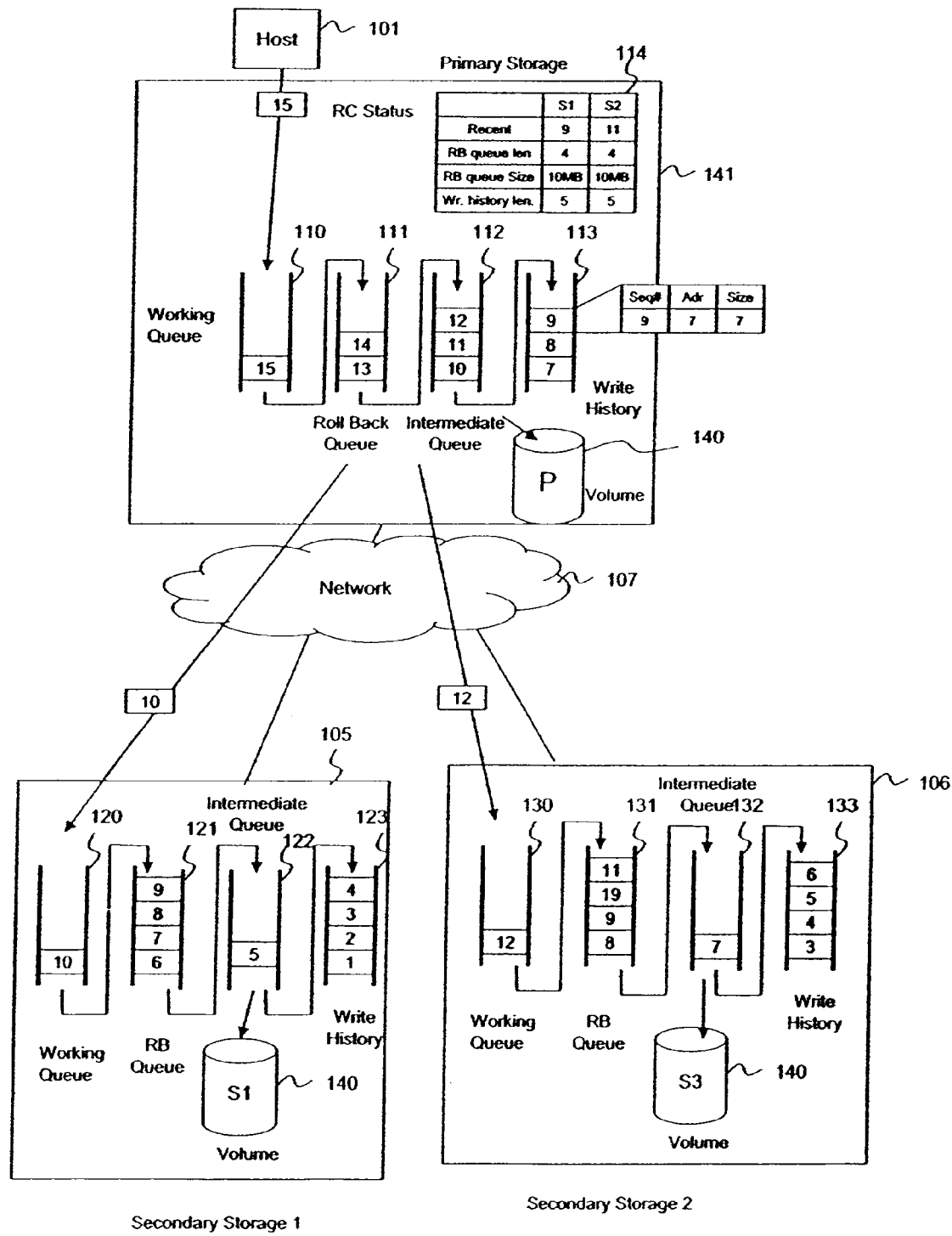
FIG. 2 is a diagram that illustrates the queue structures implemented in each of the local and remote storage facilities for keeping historical information of data updates sent by the local storage and to the remote storage facilities.

Information about data messages is kept by the storage facilities 104, 105, 106 as historical information, describing data messages sent, or in the process of being sent, by the local storage facility 104, or received by the remote storage facilities. Preferably, each storage facility implements the historical information with queue structures. FIG. 2 illustrates these queue structures. As FIG. 2 shows, the disk controller 104 includes a working queue 110, a rollback queue 111, an intermediate queue 112, and a write history queue 113. The working, rollback, intermediate, and write history queues 110-113 are mirrored at the remote storage facilities 105 (queues 120, 121, 122, and 123, respectively) and 106 (queues 130, 131, 132, and 133, respectively). The queues are implemented in a first-in-first-out (FIFO) structure.

I/O read and write requests typically include a command entry and accompanying or following data (if a write is requested). The command entry identifies the data, the location at the storage media 142 at which it is to be written (for write requests) or from which is to be read (for read requests), and such other information as may be needed according to the implementation. When an I/O request is received from the host processor 101 to write data that changes the data image mirrored by the remote storage systems 105, 106, the command entry will be assigned a sequence number. A command entry is formed, comprising the command entry and assigned sequence number. The command entry is then inserted in the working queue 110. This forms the historical information for that data and the data message that will be sent forwarding the data to the remote storage facilities.

While the command entry is in the working queue, the corresponding write request is being processed. This includes receiving the data corresponding to the write request (which is either with the request, or follows the request, depending upon the communication protocol used by the host 101 and storage system 104), assigning assigned an area of the cache 135 for the data, and writing the data to that area when received. A pointer to the cached data is then associated with the corresponding command entry. A status message is returned to the sender of the I/O request, indicating the status of the data of the I/O request, i.e., whether received or an error in receiving had been detected.

FIG. 2 shows an I/O write request being received by the disk controller 104, assigned a sequence number ("15"), and a command entry formed with the assigned sequence number and the command entry of the write request. The command entry is then placed in the working queue 110 for further processing as described above. When the I/O request is processed, assuming no error is encountered, the command entry is moved from the working queue 110 to the rollback queue 111. The rollback queue is a temporary holding area, used for a rollback synchronization by the local storage facility 104 and the remote storage facilities 105, 106, as will be described more fully below. The remote storage facilities 105, 106 have the same queue structures, including a rollback queue, for basically the same purposes. Data corresponding to the command entries contained in the rollback queue are subject to being used in the synchronization process of the present invention, which may include being discarded should a failure of one of the storage facilities be detected, or alternatively circulated among the surviving storage facilities.

From the rollback back queue 111 command entries are moved to the intermediate queue 112, which holds the entries while the associated data is awaiting or being written to the storage media 142. When written, the command entry is used to form a remote copy request for forming a data message that will be sent to the remote storages to update the data images they maintain, mirroring that of the primary storage facility 104. Then, the pointer is stripped from the command entry, and the entry is placed on a write history queue 113.

As discussed, FIG. 2 shows the command entry from an I/O request assigned a sequence number 15 received from the host processor 101 and, therefore, placed on the working queue 110. Command entries with the sequence numbers 13 and 14 are presently held in the roll back queue 111, awaiting the writing of the associated data to the storage media 142. The intermediate queue 112 is shown holding command entry with assign sequence numbers 10, 11, and 12. The command entry with sequence number 10 is either next up to be written or in the process of being written. Command entry with sequence numbers 7, 8, and 9 have had their associated data written to the storage media 142, and therefore have been placed on the write history queue 113.

The remote storage facilities maintain substantially the same queue structures, and operate in the same manner. Thus, for example, the remote storage 105 is shown as receiving a data message having a command entry assigned the sequence number 10, which is placed on the working queue while the full data package is being received. The sequence number 10 is that assigned by the local storage facility 104. Once the data message is received, its command entry is moved from the working queue to the rollback queue 121, which FIG. 2 shows presently holding command entries for data messages with the sequence numbers 6-9. The intermediate queue has a command entry for a data message that was assigned sequence number 5, which is being written to the storage media 140 of the storage facility 102. When written, the entry will be moved to the write history queue 123, along with the command entries for the data messages of sequence numbers 1-4. Depending upon the depth of the write history queue 123, an earliest entry, for example the entry for the sequence number 1, may be expelled when command entry with the sequence number 5 is placed thereon.

The other remote storage 103 has the same data queues (130, 131, . . . , 133). FIG. 2 shows the remote storage 103 as presently receiving a data message related to the sequence number 12, the command entry of which is placed on the working queue 130. Roll back queue 131 presently contains control information with sequence numbers 8-11, etc. Although it is preferred that the queues used to track the historical information by the storage facilities are maintained in memory, they may also be kept on the storage media.

The local storage facility also maintains in memory a remote copy status table 114, identifying by sequence number which data messages have been sent, which have been received and acknowledged by which remote storage facility. For example, the last data message received by the remote storage facility 105 (identified as "S1" in table 114) was that with the sequence number 9, while remote storage 106 (S2) received the data message with sequence number 11. The copy status table 114 also keeps information respecting the rollback and write history queues of the remote storage facilities. Thus, as the table 114 shows, the rollback queues of the remote storage facilities each have a "length" of 4 data message entries, and are capable of holding up to 10 megabytes of data. The write history queues for each of the remote storage facilities have five entries for five data messages. A write history size measured in bytes or otherwise in terms of bytes may also be kept in the table 114.

Figure 3:
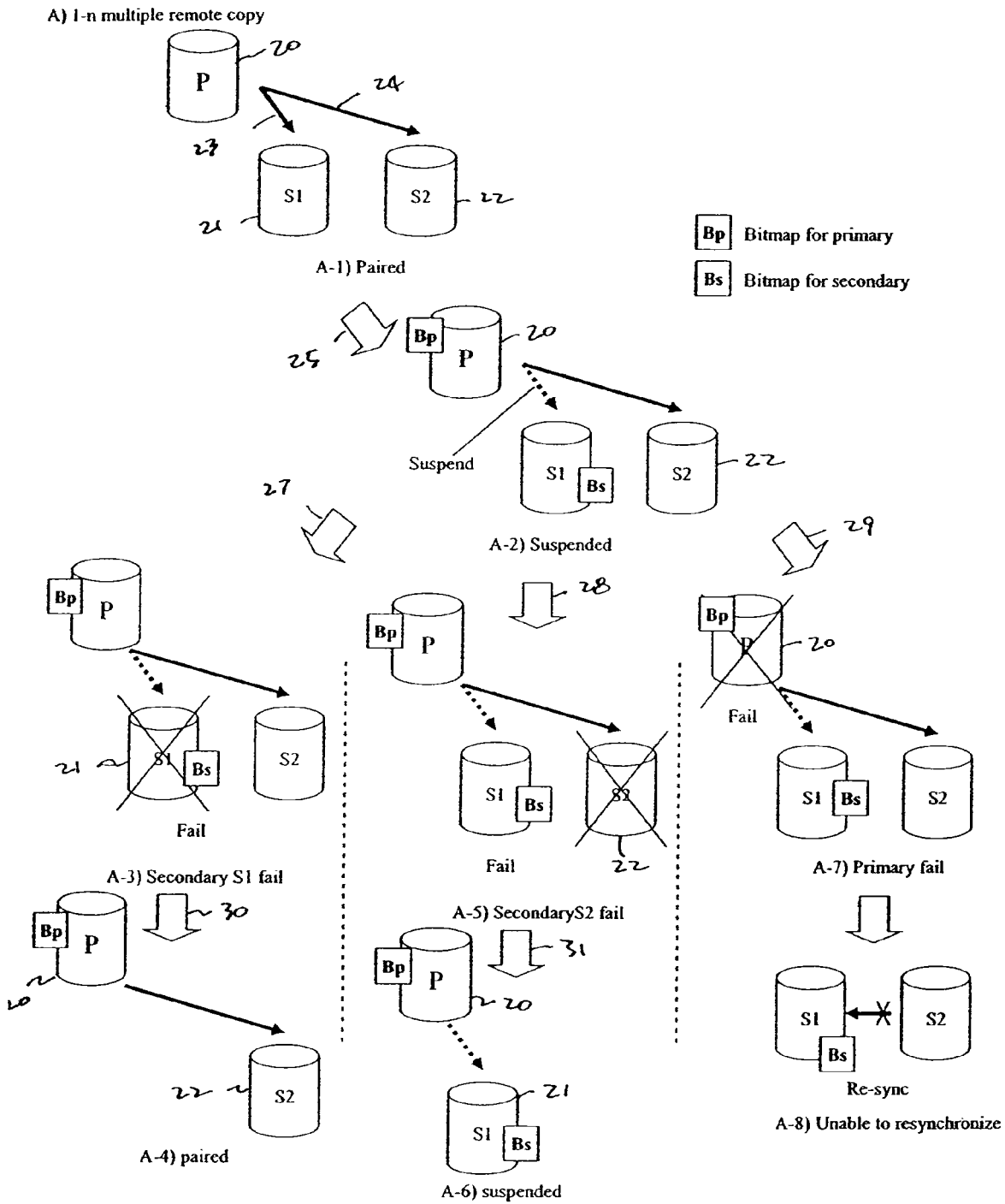
FIG. 3 is a diagram illustrating various failure modes which can cause suspension in a multiple remote copy environment.
Figure 4:
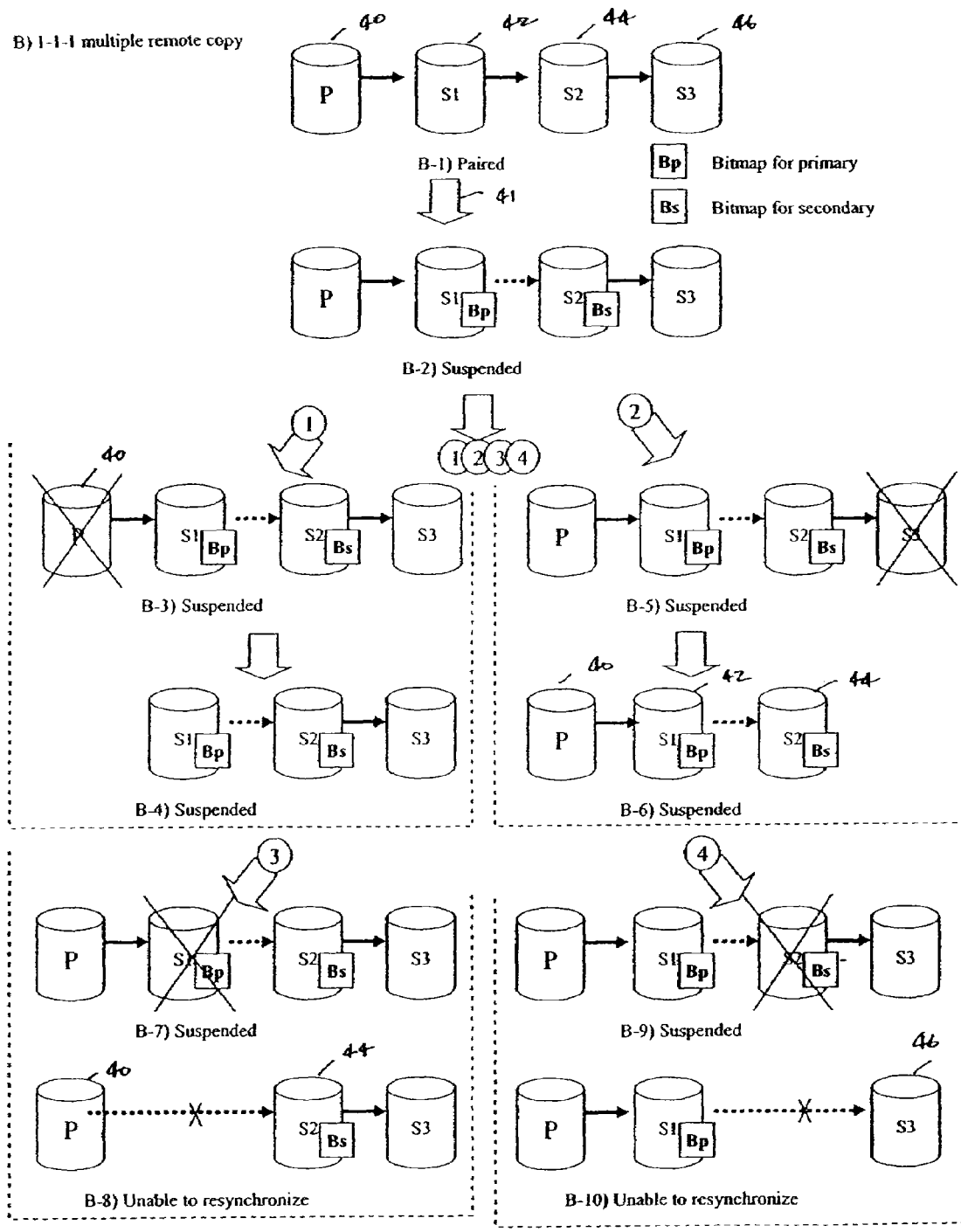
FIG. 4 is a diagram illustrating various modes which may cause suspension in a different multiple remote copy architecture.

FIGS. 3 and 4 are diagrams which illustrate problems which the invention described herein is intended to overcome. FIG. 3 illustrates a configuration of a multiple remote copy operation in which there are at least two 21, 22 secondary storage volumes corresponding to the primary storage volume 20. The arrows 23 and 24 designate remote copy links between the primary storage volume 20 and the secondary storage volumes.

In the next portion of the figure designated by the arrow 25, one of the remote links 23 has been suspended. The link can be suspended as a result of trouble in the network, or trouble at the storage media. The term "suspend" is used herein to reflect an interruption in the data transfer between the two units, regardless of its cause. As a result of the suspension, each storage media for the suspended pair (primary 20 and secondary 22) will create its own bitmap information. These bitmaps are designated by Bp and Bs in FIG. 3. The bitmap information reflects the state of the storage media at the time of the suspension. The manner in which the bitmap is created is discussed below and on parent U.S. patent application Ser. No. 10/042,376.

The next portion of the figure is a diagrammatic illustration of the three possible scenarios causing the suspension. One scenario is shown on the left side of the figure and designated by the arrow 27, while a second scenario is indicated by arrow 28, and a third scenario by arrow 29. Under the first scenario designated by arrow 27 and indicated by the portion of the drawing labeled A-3, the secondary storage media 21 is considered to have failed. In response, as shown by arrow 30, the primary storage 20 and the secondary storage 22 will be paired.

The second scenario reflected by FIG. 3 and indicated by arrow 28 is that the secondary storage 22 has failed. The response to this circumstance is indicated by arrow 21 and labeled A-6. Under this circumstance the link between the primary storage 20 and the functional secondary storage 21 awaits reestablishment. When this link is recovered, the primary storage 20 and the secondary storage 21 can be resynchronized by using the information in the two bitmaps Bp and Bs.

The right-hand portion of FIG. 3, indicated by arrow 29, indicates a third condition. Under this condition the primary storage 20 has failed, and as a result the bitmap Bp is no longer usable. Under this circumstance, as shown in the lower portion of the right-hand side of FIG. 3 and labeled A-8, a completely new data copy operation is the only way to resynchronize S1 and S2.

FIG. 4 is a diagram illustrating a different configuration of primary and secondary storage in which cascaded multiple copy is provided. As shown at the top of the diagram, primary storage 40 is configured in a cascaded manner to provide remote copy capability in conjunction with secondary storage volumes 42, 44 and 46. Arrow 41 illustrates the circumstance in which the remote copy link between S1 volume 42 and S2 volume 44 is suspended. Upon this occurrence, as also illustrated, bitmaps Bp and Bs are created by storage volumes 42 and 44. In this illustrated circumstance there are four kinds of failures that may have caused the suspension. These are illustrated in the lower portion of the diagram by arrows designated 1, 2, 3, and 4. Arrow 1 indicates the case in which the primary storage volume 40 failed. In this circumstance, as shown by case B-4, the configuration is changed so that remote copy pairs S1 and S2, and S2 and S3 remain the same.

Case 2 illustrates the situation in which secondary storage S3, which is not a member of the suspended pair, fails. In this circumstance, as shown by case B-6, the remote copy pair remains the same as before; only the configuration changes. As illustrated, the primary volume 40 continues to operate in conjunction with secondary volumes 42 and 44.

Arrow 3 reflects the circumstance in which the secondary storage S1 fails, and is a member of the suspended pair. In this case, the change information from the bitmap Bp is also lost. As a result, primary storage 40 and secondary storage 44 cannot be resynchronized. This is shown in case B-8. The pair of primary storage 40 and secondary storage S2 can only be resynchronized by a complete new copy of the data being transmitted.

Arrow 4 illustrates the remaining situation in which the secondary storage S2 fails. As in the circumstance with the situation just described, the failure of volume S2 also results in the loss of the bitmap for the change information. In this circumstance, as shown by case B-10, the only solution is to recopy all the data, for example targeting volume 46.

Figure 5:
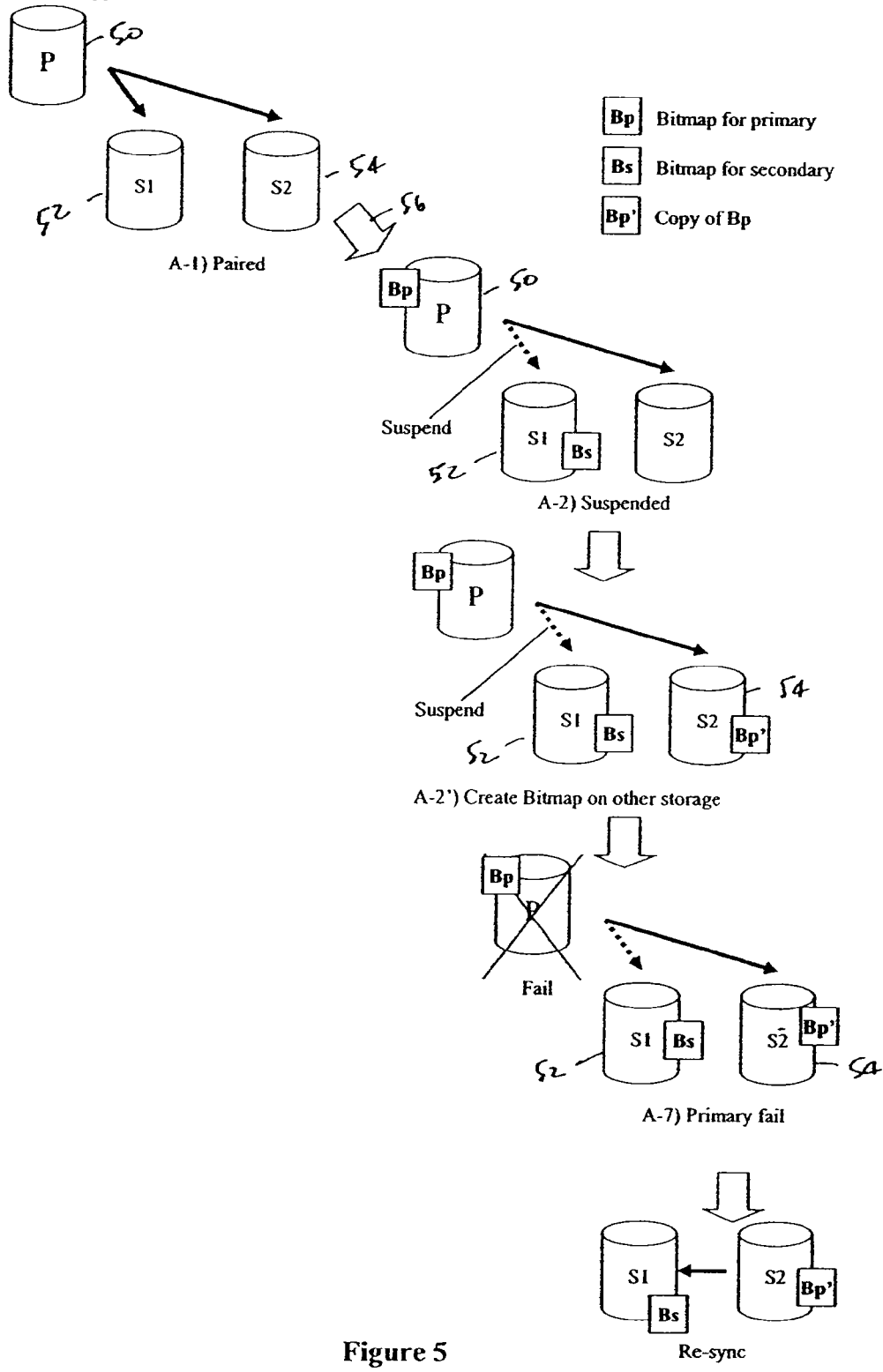
FIG. 5 is a diagram illustrating one embodiment of the method of this invention.

The circumstances described in conjunction with FIGS. 3 and 4 in which the bitmap is lost, can be overcome using the techniques of this invention. This is explained next. As described above, in some of the situations of FIGS. 3 and 4, notably situations A-3 and A-7 in FIG. 3 and B-7 and B-9 in FIG. 4, one of the bitmaps of the mirrored pair is lost. According to an embodiment of this invention, this is overcome by having, upon detection of pair suspension, the storage system create a copy of the bitmap at another storage volume which is not a member of the suspended remote copy pair. This copy of the bitmap at a separate location enables easier resynchronization when one of the bitmaps (Bp or Bs) is lost. FIG. 5 illustrates a preferred embodiment.

In FIG. 5, as shown in the upper portion of the figure, primary storage 50 is paired with secondary storage volumes 52, 54. The next portion of the figure shown at arrow 56 illustrates the occurrence of a suspension between primary volume 50 and secondary volume 52. As shown at case A-2', upon the occurrence of this suspension, the primary storage 50 creates a copy of its bitmap at a different secondary storage location 54. Volume 54 is a different volume than the one being used to mirror primary storage 50. The bitmap Bp' does not necessarily need to be identical to bitmap Bp. The minimum requirement for the copy of the bitmap storage on volume 54 is that its start time must be the same as or older than the start time for the original copy Bs. As long as the bitmap is older, any change in the copy of the bitmap simply causes overwriting of the same data into the same addresses. The teachings of the parent application describe a technique by which storage may create a copy of the bitmap from the same time as the suspension event; however, the invention described herein will function satisfactorily even if the storage cannot create the bitmap at the same time, but instead is an older copy of the bitmap. As shown by case A-7 in FIG. 5, even with the primary bitmap lost, storage volumes 52 and 54 are able to resynchronize using the copy of the primary bitmap Bp'. This resynchronization is illustrated in the bottom portion of FIG. 5 at diagram A-8.

Figure 6:
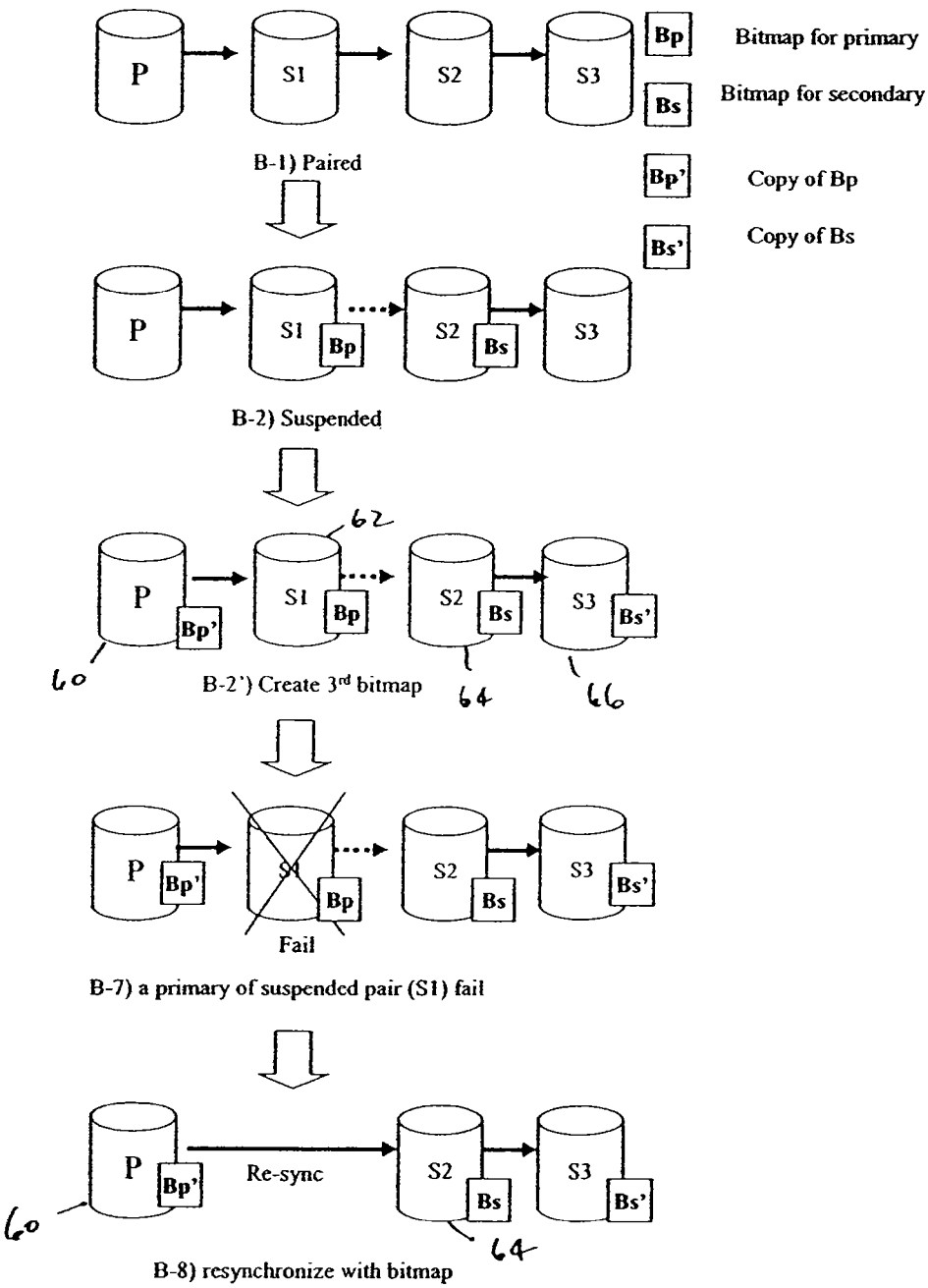
FIG. 6 is a diagram illustrating another embodiment of the invention.

FIG. 6 is another illustration of the operation of the invention in a preferred embodiment. FIG. 6 is similar to FIG. 4, illustrating the same fault condition at the top portion of the figure. Suspension of the remote copy operation has occurred at diagram B-2. In response to detection of this event, the storage systems make copies of the bitmaps to other volumes as shown by diagram B-2'. In the illustrated case, the primary volume receives a copy Bp' of the primary bitmap Bp, and secondary volume 66 receives a copy Bs' of bitmap Bs. Thus, the failure of volume 62, shown in diagram B-7, and its resulting loss of bitmap Bp, does not preclude resynchronization using the bitmaps. As shown in diagram B-8, primary volume 60 resynchronizes with secondary volume 64. If the suspension had been caused by failure of storage volume 64 instead of storage volume 62, storage volume 62 could resynchronize with storage volume 66.

Figure 7:
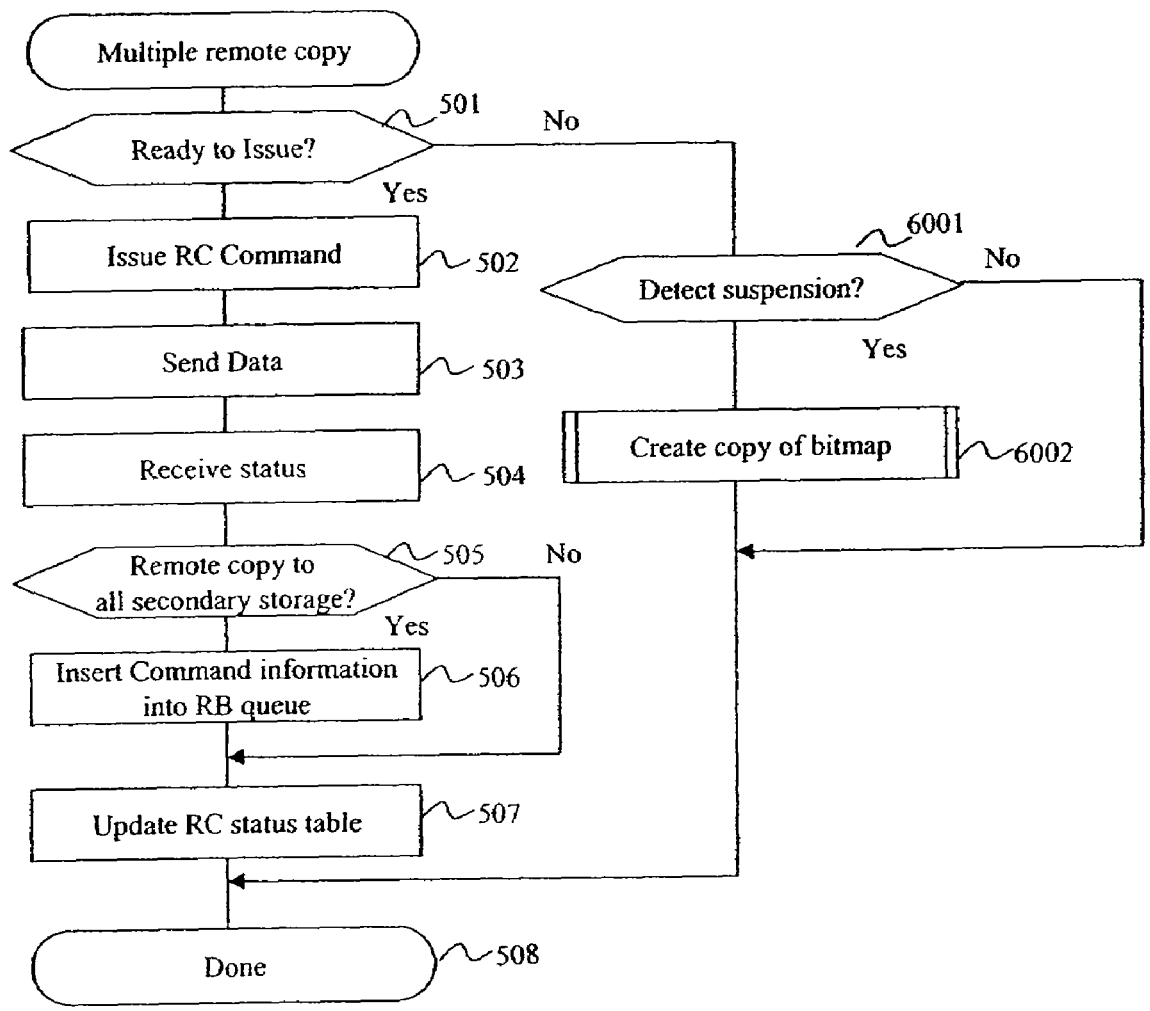
FIG. 7 is a flowchart illustrating a multiple remote copy process in which a suspension occurs.
Figure 7A:
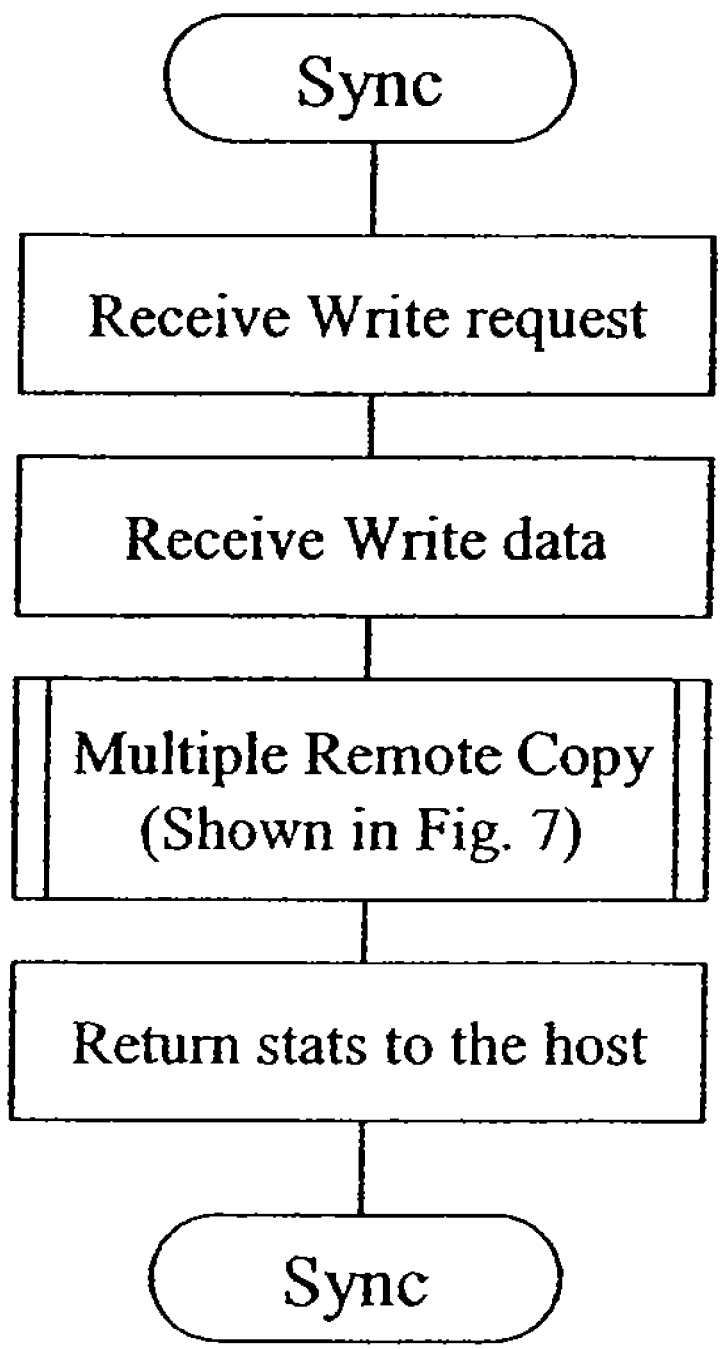
FIG. 7a is a flowchart illustrating steps preliminary to those described with reference to FIG. 7.

FIG. 7 is a flowchart illustration a preferred implementation of one method of this invention. In a synchronous remote copy, each host I/O operation causes a remote I/O operation. Thus the procedures shown in FIG. 7 are performed per host I/O. The local storage will not return a status to the host until the procedures in FIG. 7 are completed. This preliminary operation is sown in FIG. 7a. Illustrated in FIG. 7 are the principal steps taken by the local storage facility 104 (FIG. 1) for a remote copy operation to copy data updates received from the host 101 (FIG. 1) to the remote storage facilities. An I/O write request from the host processor 101 changing the data image maintained by the local storage facility 104 will necessitate a similar change of the mirrored data images maintained by the remote storage facilities. The I/O write request will result in formation of a corresponding command entry that includes an assigned a sequence number and a pointer to the data of the request. The command entry is placed in the working queue 110 until all data is received and an acknowledgment returned to the host 101. Then the command entry is moved to the roll back queue 111. When the roll back queue becomes full, or a flush command is received, the command entry will then be moved to the intermediate queue 112. While in the intermediate queue, the corresponding data of the request will be written to the storage media 142.

Periodically, the remote copy process executing on the CPU 133 will review the contents of the intermediate queue to determine if it contains command entries for which data messages will need to be formed for received I/O requests to copy the update data to each of the remote storage facilities 105, 106. Referring, then to FIG. 7, the local storage facility 104 will, check to see if each remote storage can receive data messages. It does this by reference to the RC status table 114, which tells the local storage what messages have and have not yet acknowledged as having been received by each remote storage, as well as the sizes of the various queues maintained by the remote storage. From this, the local storage can determine whether or not the particular remote storage has room to receive another data message and associated data. If not, step 501 is exited, and a procedure 6001 begun to determine if suspension occurred. (This is discussed below.) Also, the remote storages themselves can return an indication of inability to receive further data messages, for example using either of such SCSI defined "BUSY (0x08)" or "Queue Full (0x28)" status signals. In the event that the remote copy operation is synchronous, checking of the queues in the remote (secondary) storage system is unnecessary.

If the remote storage in question has sufficient room to receive a data message, the local storage will issue a remote copy (RC) command to the remote storage facility (e.g. remote storage facility 105) in the form of a data message followed, in step 503, by the data. The local storage facility 104 then awaits a status report as to whether or not the data message was received (step 504). When received, the local storage facility 104, in step 505, checks to see if all remote storage facilities have been updated with the data message. If not, the procedure moves to step 507 to update the RC status table 114 to show that the subject remote storage facility received the data message, and returns to step 501 for the next remote storage facility to receive the data message. If, however, step 505 finds that all remote storage facilities have received the data message, the data message (command entry) will be moved to the write history queue in step 506, and the RC status table 114 updated in step 507, and the procedure concluded 508 for that data message.

In the event that the remote storage cannot receive data messages, as determined at step 501, the process flow moves to step 6001 to determine whether suspension has occurred. In this operation the first determination is of the status of the remote copy pair. If there are any anomalies which prevent keeping the remote copy paired, then the remote copy pair is considered suspended. In response to this determination that suspension has occurred, the primary process is to create a copy of the bitmap as shown at step 6002. The manner in which the bitmap is created is discussed below. Once the bitmap has been created, however, the control flow shifts to step 508, completing operation of the multiple remote copy process, and shifting to a resynchronization process, also described below. By using the teachings of the parent to this application, the primary storage is able to detect the suspension point and indicate that point with a sequential number which is provided to other storage having a copy of the bitmap.

Figure 8:
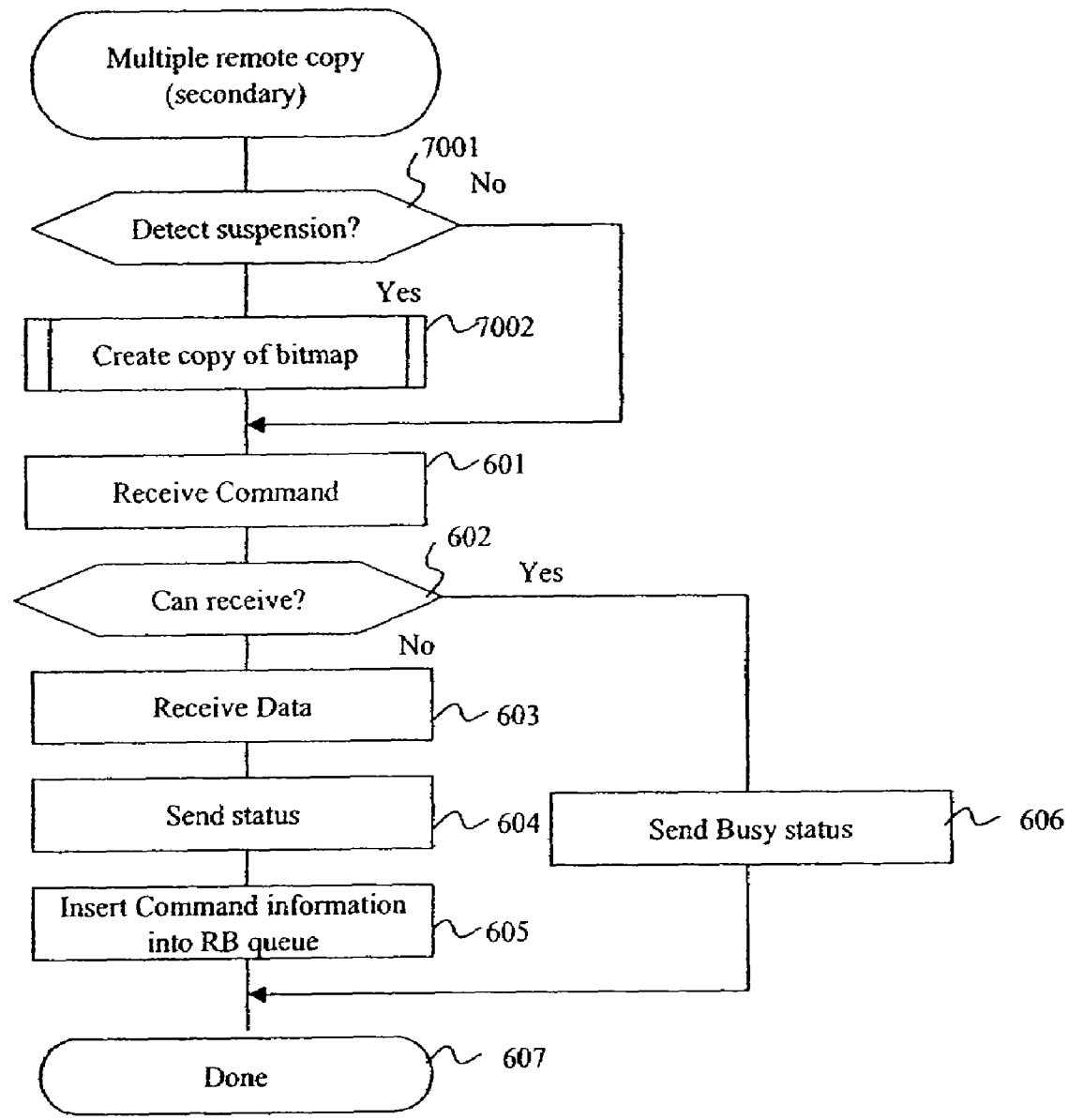
FIG. 8 is a diagram illustrating another multiple remote copy process in which a suspension occurs.

FIG. 8 is a flow diagram which broadly illustrates the steps taken at a remote storage facility to receive the data message of the remote copy process. The first step 7001 is to determine whether a suspension has occurred. This is performed using the same techniques as described in conjunction with FIG. 7. If a suspension has occurred, then a copy of the bitmap is created at step 7002, using the techniques described below in conjunction with FIG. 9. If suspension has not occurred, the process flow moves to step 601. At step 601 the remote storage facility receives a data message, and in step 602 checks the availability status of the queue resource for that data message. In other words, it determines if there is room available. The determination at step 602 will also depend upon the alignment of the queues (i.e., rollback, intermediate, and write history queues) relative to the content of the queues of the other remote storage facilities. If the decision at step 602 is that the remote storage facility cannot receive the data at this time, step 602 will be exited in favor of step 606 at which the remote storage facility returns a "busy" status message to the local storage facility and exits the received procedure. The local storage facility then determines that it must try the transaction again later. On the other hand, if at step 602 it is determined the data can be received, the data is received at step 603. At step 604 the remote storage facility then returns the status of the data transmission, and at step 605 the data message is moved from the working queue, used to receive the message in data, to the rollback queue. As shown by step 607, this completes the process.

Figure 9:
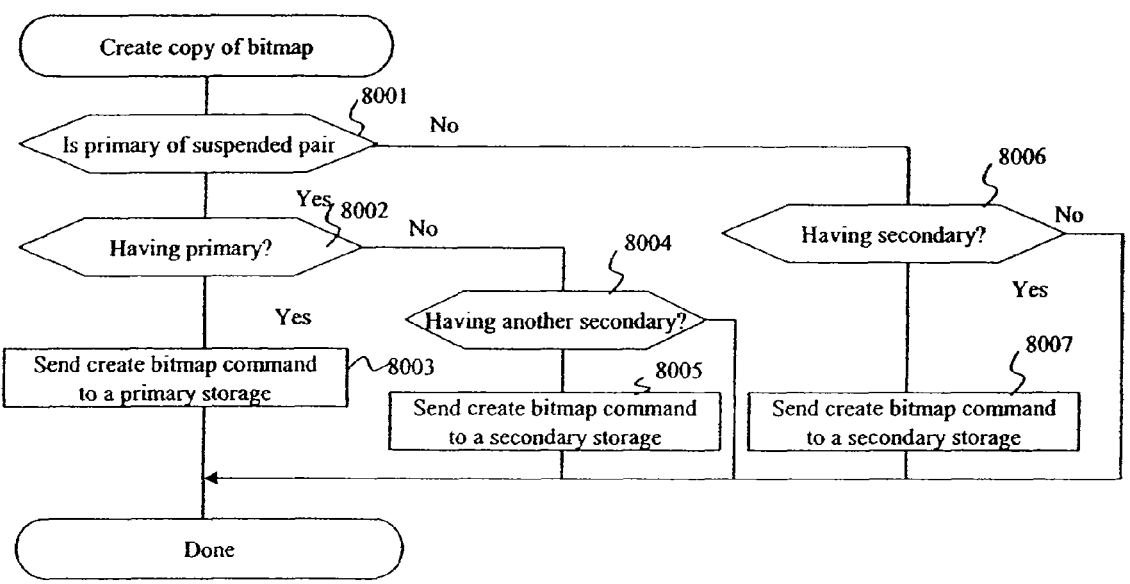
FIG. 9 is a flowchart illustrating a preferred method of creating a copy of a bitmap at the time of suspension.
Figure 10:
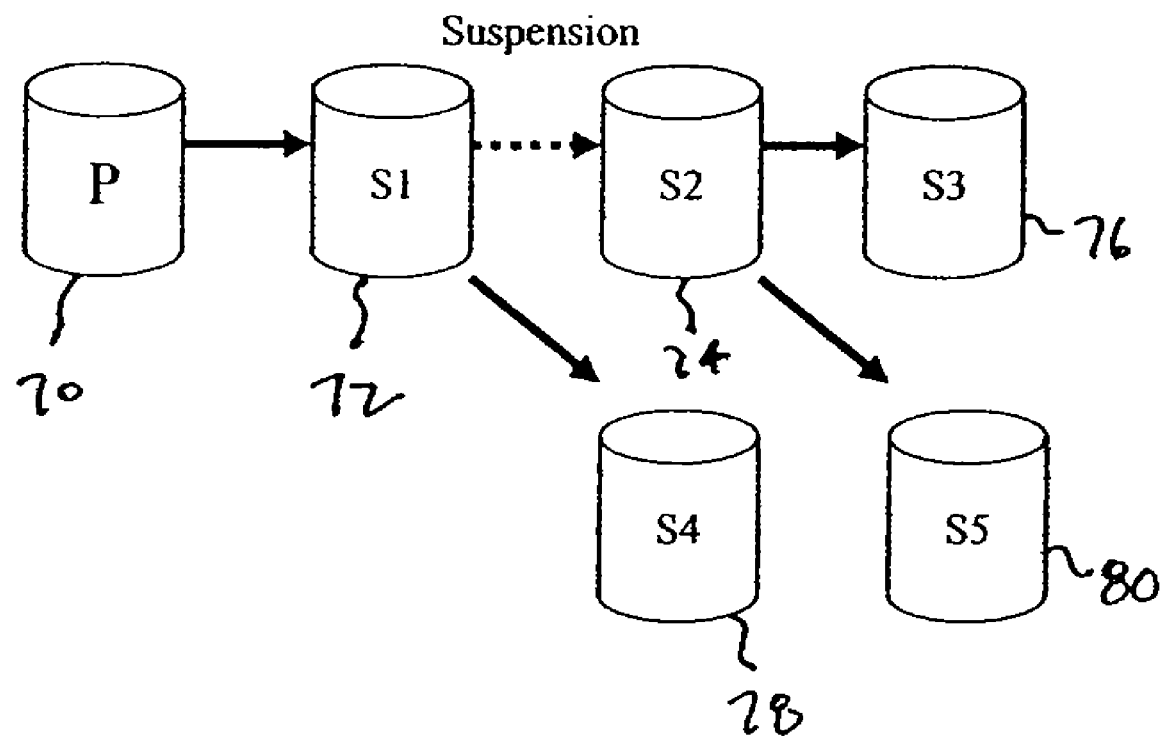
FIG. 10 is a diagram used for explanation of FIG. 9.

FIG. 9 is a flowchart illustrating a preferred embodiment of the procedure for creating a copy of the bitmap, for example, as performed at step 6002 in FIG. 7 or step 7002 in FIG. 8. FIG. 10 is a diagram illustrating an exemplary configuration for use in explaining the flowchart of FIG. 9. In FIG. 10 storage 72 is the primary storage of a suspended remote copy pair consisting of volumes 72 and 74.

There are three different techniques which can be used to create the bitmap or bitmaps from the suspension point. One technique for creating a bitmap from the suspension point is to use the technique described in the parent application to this application. This technique is summarized in FIG. 9. Because storage has a rollback queue and a write history reflecting all change information, the various storage volumes in a multiple remote copy environment may create bitmaps from identical times or identical sequence numbers. As shown in FIG. 9, at step 8001, the storage checks itself to determine if it is a primary storage volume or a secondary storage volume of a suspended remote copy pair. In the case illustrated in FIG. 10, storage volume 72 would be a primary storage volume and storage volume 74 a secondary storage volume of that pair. In other words, "primary" and "secondary" are relative terms. The procedure carried out by the primary storage volume 72 is shown at step 8002.

At step 8003 the storage volume 72 has detected the suspension point, which may be expressed in terms of time, or sequence numbers from the remote copy commands. In response, volume 72 issues a "create a copy of bitmap command" to primary storage volume 70. As next shown at step 8004, if the primary storage volume 72 of the suspended remote copy pair has another secondary storage, for example storage volume 78, as shown in FIG. 10, this step is carried out. Thus, as shown by step 8005, a bitmap is also created in secondary storage volume 78.

The procedure carried out by storage volume 74 is similar to that already described. If the secondary storage of the suspended copy pair has one or more secondary storages itself, such as storages 78 or 80, copies of the second bitmap on storage 74 will be made to one or the other of storage volumes 76 or 80. This is shown at step 8007.

Figure 11:
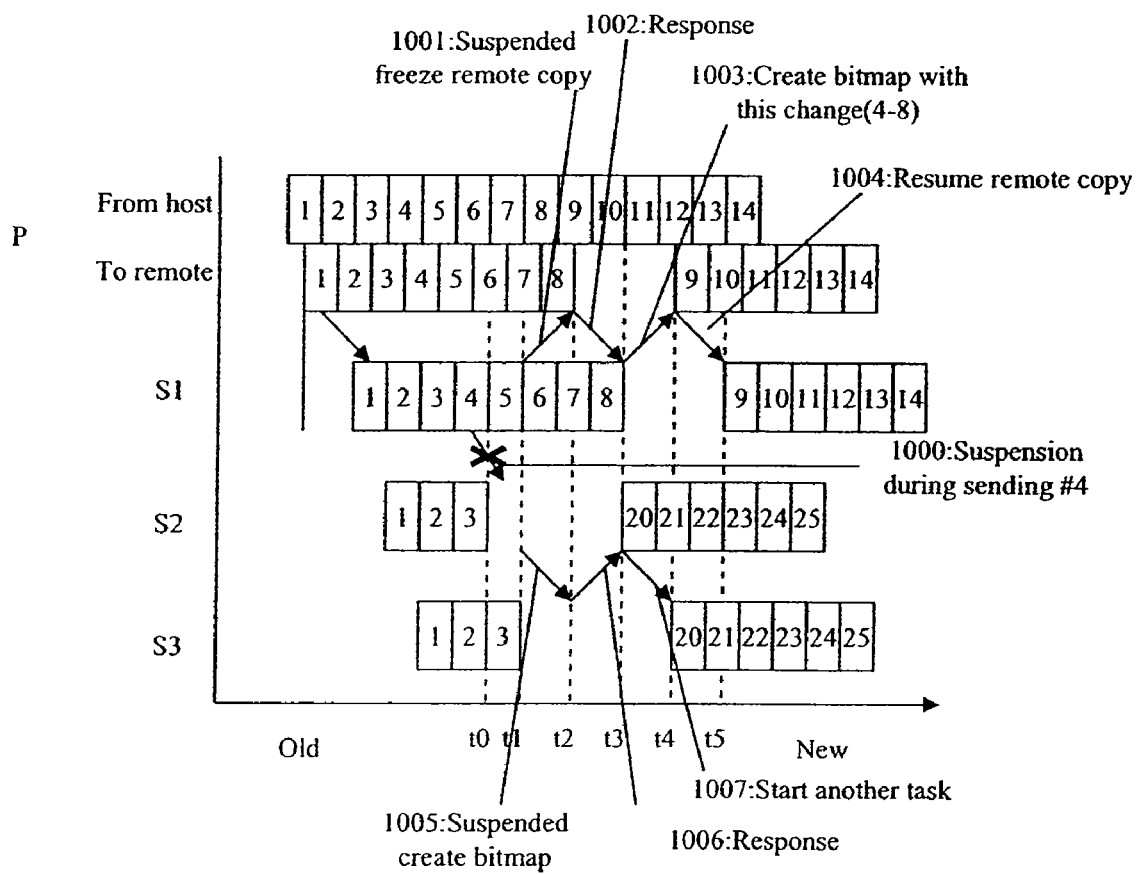
FIG. 11 illustrates details of a sequence of operations in which copies of bitmaps are created.

FIG. 11 illustrates another embodiment of this invention. In FIG. 11, the rows designate various storages, while the numbered blocks in the figure designate various data transfer operations. For example, the top row of FIG. 11 shows 14 data transfers to be made from the host system to remote systems. As this data is retrieved, it is transmitted to remote storage volumes S1, S2 and S3. The difference in timing for the beginning of data block 1 reflects the processing and transmission delays inherent in sending the data from one location to another.

In FIG. 11 the suspension is assumed to have occurred at step 1000 during the sending of data block 4 from storage volume S1 to storage volume S2. This is noted as time to. In essence, the fourth remote copy request has failed. As a result, at least the bitmaps Bp and Bp' should include change information.

At time t1 storage volume S1 issues a suspension detection message to the storage which should have a copy of the bitmap, as shown by operation 1001. At time t2 the primary storage has received the "suspension detected" message and stops the remote copy operation. It then sends a response 1002 to the issuer of the request. During the freezing of the remote copy operation, primary storage P maintains its host connection, assuming storage volume P can maintain a record of changes since the suspension occurred. If storage cannot maintain this information, then storage P must disconnect from the host until a copy of the bitmap is created. In the illustrated embodiment, the change information will be stored in a cache memory or on disk.

At time t3, storage volume S1 receives a response from the primary storage volume P. S1 sends its "create bitmap" message with change information (as shown by operation 1003). The change information will be from the suspension point t0 to the point of receiving the "response" (time t3). At time t4, the "create bitmap" message is received with the change information. In response, storage volume P begins to create a copy of the bitmap Bp' corresponding to bitmap Bp. Once this is finished it resumes the remote copy operation between the primary storage volume P and the secondary storage volume S1. This is shown by operation 1004. At time t5, S1 also begins its remote copy operation.

The creation of a copy of bitmap Bs is shown with respect to operations 1005 and later. Assuming that the suspension occurred at 1005 (or earlier), only the storage volumes S1 and S2 are aware of the suspension. Remote copy request No. 4 fails and does not reach storage volume S2. Thus, at least bitmaps Bs and Bs' should include change information after remote copy request No. 3 has been processed. Therefore, storage volume S2 begins to create a bitmap Bs of the suspended pair.

At time t2, storage volume S3 receives the "suspension detected" message, and in response creates a copy of bitmap Bs'. It then sends a "response" to the issuer of the request (storage volume S2). This is shown by operation 1006 in FIG. 11.

When storage volume S2 receives the "response," it resumes a remote copy link between storage volumes S2 and S3. When this occurs storage volume S2 can be used for other purposes, for example, carrying out requests 20-25 as shown in FIG. 11.

To summarize the operations described in conjunction with the recent figures, a common procedure for the operations is:
(1) Detect the suspension at the first storage volume and create a bitmap.
(2) Select the second storage, which should have a copy of the bitmap.
(3) Freeze the remote copy operation between the first and second storage volumes. If the remote copy operation between these two volumes is from the second volume to the first, then the second needs to send a "freeze" message to the first to freeze the remote copy operation between the first and second.
(4) Send the change information at the first storage (which includes changes from the suspension point) to the second storage.
(5) Create a copy of the bitmap at the second storage volume.
(6) Resume the remote copy operation between the first and second storage volumes.

Figure 12:
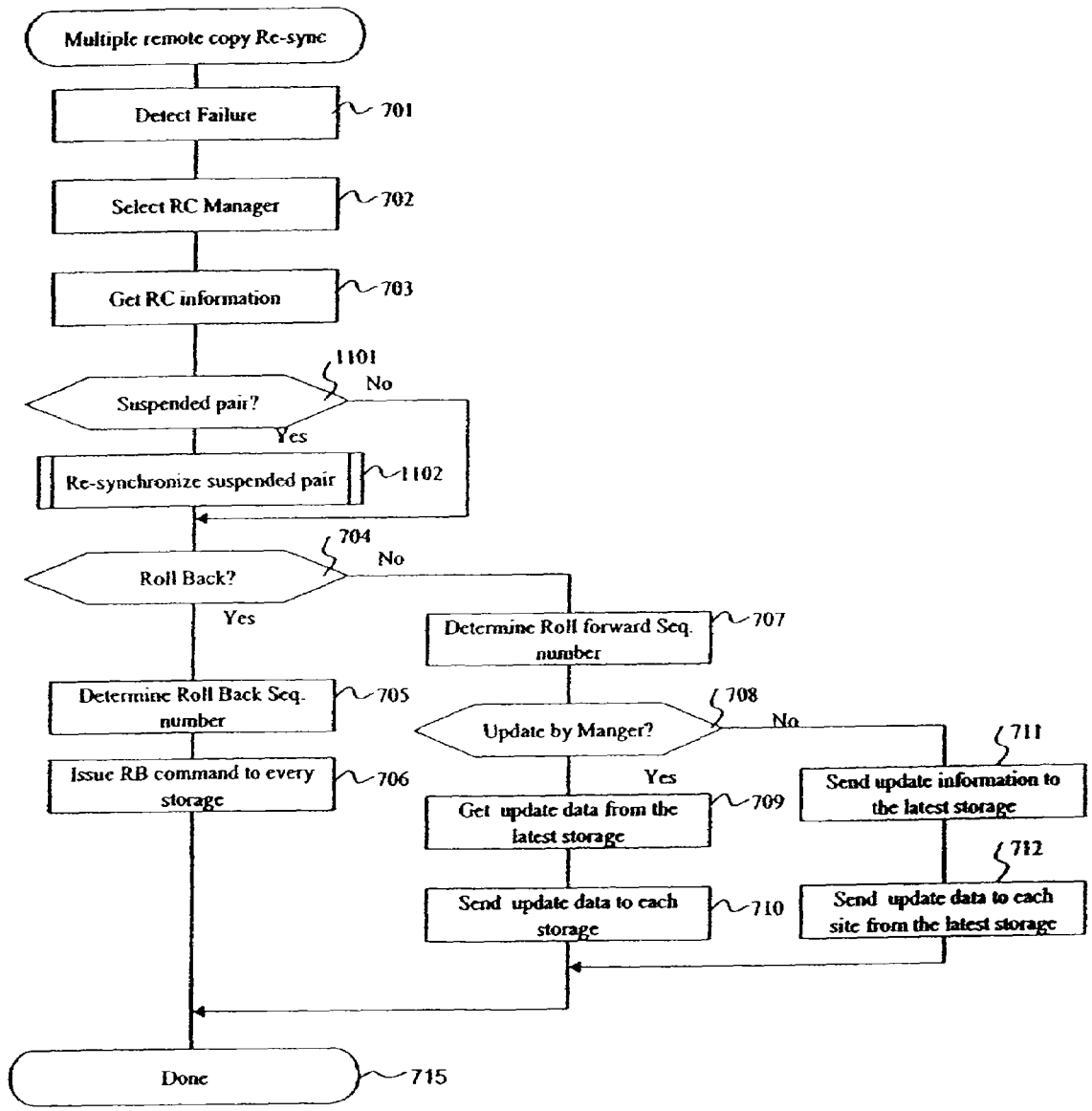
FIG. 12 is a flowchart illustrating one method for resynchronization.

FIG. 12 illustrates the steps taken for a synchronization process when a failure of the local storage facility is detected (or a failure of a remote storage facility if it is an intermediate site in a daisy chain configuration). In step 701 a failure is detected. Failure detection may be accomplished in a number of ways. For example, the storage facilities may broadcast to one another heartbeat messages that, when absent, indicate a failure; or, a storage facility may be capable of detecting a failure of itself, but still be able to broadcast that failure to the other elements of the system; or any other conventional failure detection technique. When a failure is detected, the remaining storage facilities, such as storage facilities 105, 106 in the configuration shown in FIG. 2, will communicate with one another to negotiate among themselves who will be the new remote copy manager. The selected storage facility will control remote copy operations to ensure that the data images of all remaining storage facilities are synchronized to the same state. Alternatively, a remote copy manager may be predefined by a system administrator. However selected, the remote copy manager becomes the local storage facility and, in step 703, gathers information concerning the content and structures of the various queues maintained by the remaining storage facilities. This information includes the range (number of entries) of the roll back and write history queues, including how many entries contain data messages. For example, referring to FIG. 2, in the event the local storage facility 104 fails, and the remote storage facility 105 is elected or otherwise determined to be the remote copy manager in step 702, the remote storage 106 will report that its roll back queue 131 contained data messages 8, 9, 10, and 11, and that its write history queue 133 contains data messages 3, 4, 5, and 6. The content of the intermediate queue of the remote storage facility 106 will shortly be added to the write history queue because preferably when a failure is detected the remote storage facility will empty the intermediate queues, thereby writing the data to the storage media maintained.

As shown by step 1102, next a determination is made if the pair is suspended. If not, the process moves to step 705 as described below. On the other hand, if the operation has been suspended, then the suspended pair need to be resynchronized. This is indicated by step 1102, which is the procedure shown in FIG. 13 and described there.

Having now obtained the information about the remote copy environment of the remaining storage facilities, after a failure of one of them, the elected remote copy manager determines whether to perform a roll back operation or a roll forward operation. Typically, this will be predetermined by an administrator or user of the remote copy environment, setting a flag as to how best to synchronize the storage facilities in the face of a failure. If step 704 determines that a roll back procedure is to be used, step 705 follows with the remote copy manager determining the data message held by all storage facilities having the highest sequence number. For example, referring to FIG. 2, the data message having the sequence number 9 meets that criteria. Accordingly, in step 706, the elected remote copy manager will issue a roll back command to all other storage facilities that, when received, will cause them to discard data messages having sequence numbers greater than 9. Thus, again referring to FIG. 2, the remote storage facility 106, when it receives the roll back command, will discard the messages having sequence numbers 10 and 11. The procedure then concludes at step 715.

If, on the other hand, the decision made at step 704 is to roll forward, step 707 is executed to determine a roll forward sequence number. This is accomplished by the remote copy procedure comparing the contents of the various roll back and write history queues to determine that storage facility having the latest data messages, if any. Thus, in FIG. 2, if the elected remote copy manager is storage facility 105, it will see that the remote storage facility 106 contains data messages having the sequence numbers 10 and 11, while it does not. Accordingly, it will initiate a copy procedure from the remote storage facility 106 of the data messages 10 and 11 so that the data images maintained by each will be synchronized. Thus, in step 708, if the elected remote copy manager determines that it is the most up to date storage facility, it will leave step 708 in favor of step 709 in which the selected RC manager obtains the update data from the storage facility having the most recently received data messages. This could be the selected RC manager itself, or it could be one of the other storage facilities. In any event, when the selected RC manager receives the update data, it will move to step 710 to selectively transmit the update data, or portions thereof, to the other storage facility needing update to synchronize the data images of all remote storage facilities. The procedure will then conclude with step 715.

Conversely, if the decision made in step 708 is that the synchronization will be performed by the storage facility having the most recent data message updates, and that storage facility is not the selected RC manager, (or another storage facility has been predetermined to be the synchronizing facility), the RC manager will send the update information, comprising which storage facilities need updating, to that storage facility having the most recent updates. Then, in step 712, update data, in the form of data messages, will be sent to all storage facilities needing synchronization of their data images, and the procedure concludes with step 715.

If rollback procedures are to be employed, for example, as discussed in the parent application, the RB queues should of the remote storage facilities 105, 106 (FIG. 1) will preferably be aligned. An alignment procedure is performed by the local storage facility 104, using the remote copy process executing on the CPU 133 and the remote copy status table 114 (providing information as to the content of the various queues maintained by the remote storage facilities 105, 106). For example, there may be occasions when a remote storage is unable to receive remote copy data messages from the local storage facility, while the other remote storage facilities do. In this situation care must be taken to ensure, for synchronization purposes, that there is at least a one data message overlap between the data messages in the queues of one remote storage facility when compared to any other remote storage facility to ensure that synchronization can always take place when needed.

Figure 13:
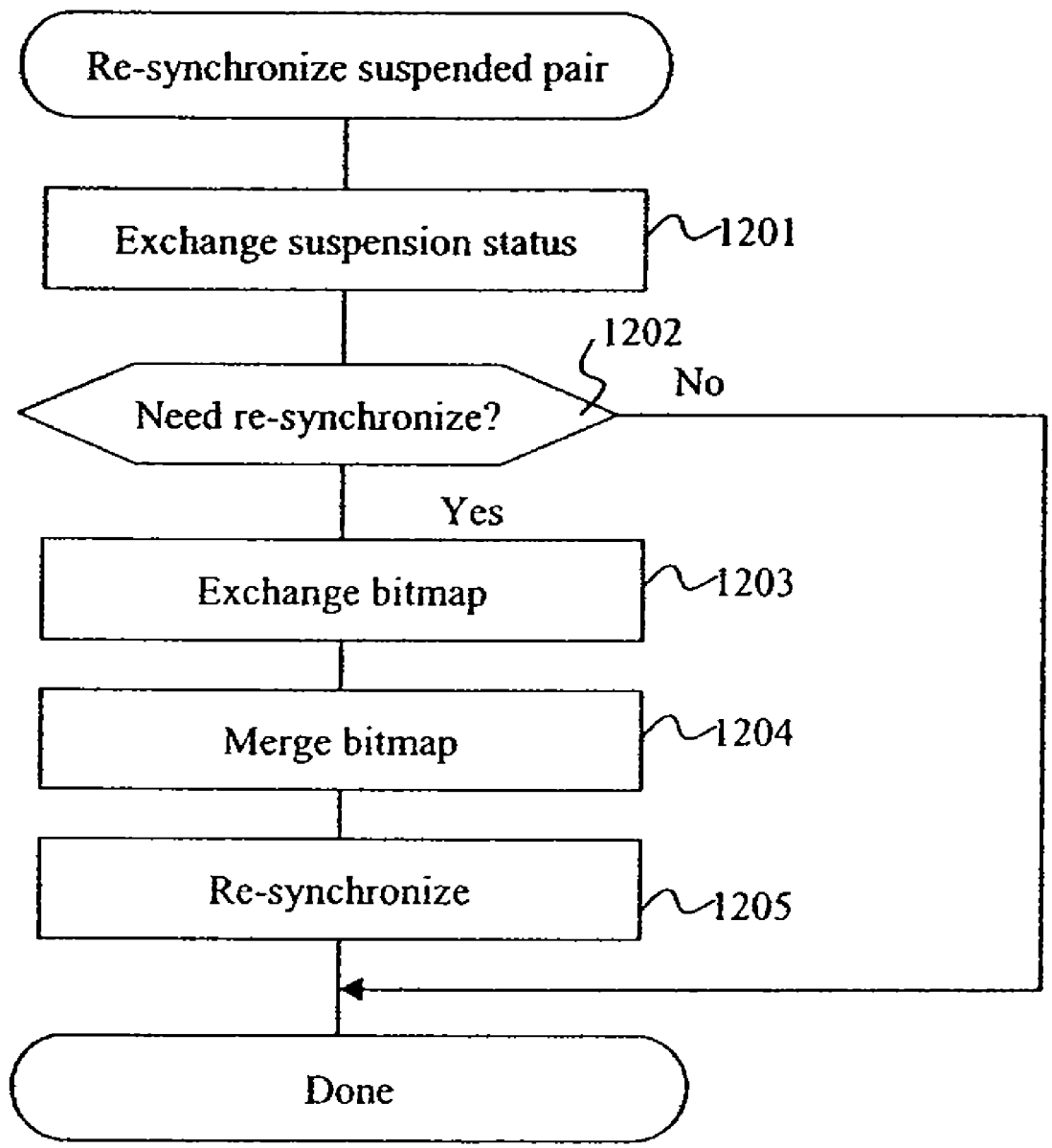
FIG. 13 is a flowchart illustrating another method for resynchronization.

FIG. 13 is a flow diagram illustrating details of the resynchronization procedure. Initially, each storage volume which has a copy of the bitmap will check the status of the remote copy pair and exchange information about that status. This is shown at step 1201. In this circumstances requiring resynchronization using a copy of the bitmap, the resynchronization will need to be done not only between the suspended pair, but also any combination of the pairs of storage volumes which have copies of the bitmap, e.g., Bp, Bp', Bs or Bs'. If at step 1202 it is determined there is no need to resynchronize using the bitmap copies, then the process ends. On the other hand, if there is a need to resynchronize, then the bitmaps are exchanged (1203) and merged (1204), then resynchronized using the merged bitmap, as shown at step 1205.

The method and apparatus described above enable copies to be resynchronized in multiple remote copy environments. Whenever this resynchronization is reneeded, for example particularly in the case of systems employing remote copy suspension, it is performed automatically without administrator assistance.

While preferred embodiments of the invention have been described above, it will be appreciated that numerous variations may be made from the described implementation without departing from the scope of the invention.

What is claimed is:

1. A remote copy system, comprising:
   a first storage system including a first storage controller and a first data volume, the first storage controller being configured to receive a write request from a first host associated with the first storage system and to store a write data associated with the write request to the first data volume;
   a second storage system coupled to the first storage system, including a second storage controller and a second data volume, the second storage controller receiving first data containing the write data to copy the stored data in the first data volume to the second data volume; and
   a third storage system coupled to the second storage system, including a third storage controller and a third data volume, the third storage controller receiving second data containing the write data to copy the stored data in the first data volume to the third data volume,
   wherein the second storage system manages a first status information indicating whether a corresponding data to the write data received at the second storage system is necessary to be transmitted from the first storage system to the third storage system,
   wherein the third storage system manages a second status information indicating whether data is changed on the third storage volume,
   wherein the second storage system and the third storage system synchronize the second data volume and the third data volume by using the first status information and the second status information when the first storage system experiences failure,
   wherein the second storage system and the third storage system synchronize the second data volume and the third data volume by exchanging a differential data between the second data volume and the third data volume.

2. The remote copy system of claim 1, wherein the first status information has a bitmap table including updated information to the first data volume from or before detecting interruption in communications between the first storage system and the third storage system.

3. The remote copy system of claim 1, wherein the second storage system records the first status information in a memory area therein.

4. The remote copy system of claim 3, wherein the second storage system manages the first status information recorded in the memory area based on information from the first storage system.

5. The remote copy system of claim 1, further comprising:
   a second host coupled to the second storage system, wherein the second storage system is configured to function as a primary storage system if the first storage system experiences failure.

6. The remote copy system of claim 1, wherein one of the second or the third storage system receives the differential data from another storage system having the most recently received data from the first storage system.

7. The remote copy system of claim 1, wherein one of the second or the third storage system determines whether to perform a rollback operation or a roll forward operation.

8. The remote copy system of claim 1, wherein one of the second or the third storage system determines whether to synchronize the third storage volume to the second storage volume or synchronize the second storage volume to the third storage volume.

* * * * *